United States Patent
Benco et al.

(10) Patent No.: US 7,546,299 B2
(45) Date of Patent: Jun. 9, 2009

(54) NETWORK SUPPORTED NETWORK FILE SHARING AMONG MOBILE SUBSCRIBERS

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 507 days.

(21) Appl. No.: 10/843,763

(22) Filed: May 12, 2004

(65) Prior Publication Data
US 2005/0256870 A1 Nov. 17, 2005

(51) Int. Cl.
G06F 17/30 (2006.01)

(52) U.S. Cl. .................. 707/10; 707/8; 707/9; 707/203; 707/205

(58) Field of Classification Search ........ 707/3, 707/10, 100, 9, 104.1, 8, 203, 205; 715/505; 370/352, 390, 329; 709/202, 213, 206; 455/414.1, 455/422, 41.2, 557, 509, 558, 3.01, 419; 710/305; 713/189
See application file for complete search history.

(56) References Cited

U.S. PATENT DOCUMENTS

| | | | | |
|---|---|---|---|---|
| 5,664,207 A * | 9/1997 | Crumpler et al. | ............ | 715/505 |
| 5,819,274 A * | 10/1998 | Jackson, Jr. | ................... | 707/10 |
| 6,061,683 A * | 5/2000 | Alonso | ........................... | 707/8 |
| 6,594,666 B1 * | 7/2003 | Biswas et al. | ............... | 707/100 |
| 6,636,802 B1 * | 10/2003 | Nakano et al. | ............... | 701/208 |
| 7,068,623 B1 * | 6/2006 | Barany et al. | ............... | 370/329 |
| 7,302,274 B2 * | 11/2007 | Makela et al. | ............... | 455/509 |
| 7,337,327 B1 * | 2/2008 | Sallam | ........................ | 713/189 |
| 2002/0123335 A1 * | 9/2002 | Luna et al. | ................... | 455/419 |
| 2002/0151299 A1 * | 10/2002 | Son | ............................ | 455/422 |
| 2002/0184318 A1 * | 12/2002 | Pineau | ....................... | 709/206 |
| 2003/0206739 A1 * | 11/2003 | Lu | ............................. | 396/429 |
| 2004/0002896 A1 * | 1/2004 | Alanen et al. | ................. | 705/14 |
| 2004/0002943 A1 * | 1/2004 | Merrill et al. | ................... | 707/1 |
| 2004/0064480 A1 * | 4/2004 | Bartlett et al. | ........... | 707/104.1 |
| 2004/0083195 A1 * | 4/2004 | McCord et al. | ............... | 706/47 |
| 2004/0088348 A1 * | 5/2004 | Yeager et al. | ............... | 709/202 |
| 2004/0110462 A1 * | 6/2004 | Forstadius | ................. | 455/3.01 |
| 2004/0213231 A1 * | 10/2004 | Cho et al. | .................... | 370/390 |

(Continued)

OTHER PUBLICATIONS

Yolanda Villate et al., "Keep your data safe and available while roaming", ACM, 2002, pp. 315-325.*

(Continued)

Primary Examiner—Thuy N Pardo

(57) ABSTRACT

Embodiments of the method and apparatus provide remote access and file sharing functionality between mobile terminals of mobile subscribers in a telecommunication network. One embodiment may have the steps of: defining at least one privileged mobile terminal that has remote access to a first mobile terminal; defining file sharing strategy for at least one file that is sharable with the at least one privileged mobile terminal; and storing, in a database of the network, identification of the at least one privileged mobile terminal that has remote access privileges to the first mobile terminal, and the file sharing strategy for the at least one file on the first privileged mobile terminal. The apparatus implements the method.

24 Claims, 4 Drawing Sheets

U.S. PATENT DOCUMENTS

| | | | |
|---|---|---|---|
| 2004/0235457 A1* | 11/2004 | Florkey et al. | 455/414.1 |
| 2005/0044165 A1* | 2/2005 | O'Farrell et al. | 709/213 |
| 2005/0149564 A1* | 7/2005 | Jain et al. | 707/104.1 |
| 2005/0192052 A1* | 9/2005 | Tenhunen | 455/557 |
| 2005/0215195 A1* | 9/2005 | Light et al. | 455/41.2 |
| 2005/0216639 A1* | 9/2005 | Sparer et al. | 710/305 |
| 2005/0232242 A1* | 10/2005 | Karaoguz et al. | 370/352 |
| 2006/0116167 A1* | 6/2006 | Raviv et al. | 455/558 |

OTHER PUBLICATIONS

Roberto J. Bayardo Jr. et al., "YouServ: A Web-hosting and content sharing tool for the masses", ACM, 2002, pp. 345-354.*

* cited by examiner

NETWORK SUPPORTED NETWORK FILE SHARING AMONG MOBILE SUBSCRIBERS

TECHNICAL FIELD

The present invention relates generally to telephony and more particularly to a method and system that provides remote access and file sharing functionality between mobile terminals of mobile subscribers in a communication network.

BACKGROUND OF THE INVENTION

As mobile terminals, in particular cell phones, have gained more popularity and increased internal memory, a mobile subscriber can now store information and applications in the mobile terminal. Electronic calendars, electronic phonebooks, graphic images, photos, presentation files, etc. are now storable in mobile terminals. In the prior art if a mobile user of a first mobile terminal wants to allow other mobile users (and also any other type of user) to view files on and/or download files from the first mobile terminal, the mobile user must email the files to select other mobile users. This does not allow the other mobile users to browse the files on the first mobile terminal, and choose to view and/or download selected files.

It is necessary to provide some level of security if files are to be viewed and/or downloaded. Authentication initially involves verification of the user's identity. Secure systems must verify, or validate, the user's name, password and location. The use of third-party name services permits the use of a single database to store privileges for users on the local network, as well as for remote users. This helps minimize the number of user databases required to assign privileges such as printer use, server access and remote dial-in access. Authentication for remote access has distinct feature requirements and is more complex than general LAN security.

A number of file discovery and sharing programs are known for use across networks, especially those programs, which permit the sharing of multimedia content. Users connect to a central directory service and upload a list of files that they currently have on their local system, which may be requested by other participants in the directory service. To retrieve files, users send a request for a file to the central directory service, which then connects the requesting user to another user's computer containing that file which computer is also currently online. One known program of this type is Napster, a utility for sharing audio files by manually registering them with a central directory service. Other known programs provide for sharing more general-purpose files. The general term for both programs is "peer-to-peer file sharing service".

While the processing capability and memory storage of mobile phones continues to increase, there remains a need to conserve mobile resources, particularly memory. For this reason, it is not practical for the mobile to run the standard software file sharing Web server applications (e.g., HTTP, FTP, etc., since for example the widely used Apache Web server would consume too much of the limited resources of the mobile phone). Also, mobile phones currently do not support the operating system software capable of supporting the multi-process requirements of Web servers. For these reasons, it is necessary to equip the mobile phone with skeletal file-sharing software that is capable only of single-user, single-process file sharing. To maintain the simplicity of the mobile-resident software, all file-sharing and remote access mobile phone support is coordinated via a separate Remote File Sharing Server.

One problem in the prior art is that when a first user has an electronic calendar, and when a second user desires to view the calendar, the second user must have the first user check the calendar stored in the first mobile terminal. This can be very inconvenient for the first user. Thus, it is a drawback of the prior art that there is a lack of remote access and file sharing functionality between mobile terminals of mobile subscribers in the network.

SUMMARY

The invention in one implementation encompasses an apparatus. The apparatus may be for use in a telecommunications network for providing remote access and file sharing functionality between mobile terminals of mobile subscribers in the network. The apparatus has: a telecommunication network operatively connected to at least first and second mobile terminals, the first mobile terminal having a plurality of sharable files; the telecommunication network having a call controller, a mobile subscriber database, and a remote file sharing system; identification data indicative of a set of privileged mobile terminals stored in a mobile terminal identification database in the network; file sharing strategy for a set of files that are sharable with the set of privileged mobile terminals, the file sharing strategy stored in a file sharing strategy database in the network; the remote file sharing system having a controller module operatively connected to a remote access module and to a file sharing module, the controller module also operatively connected to the call controller, to the mobile terminal identification database and to the file sharing strategy database; and wherein the second mobile terminal, which has remote access to the first mobile terminal, has capabilities of at least one of viewing files and downloading files according to the file sharing strategy of the first mobile terminal.

Another implementation of the invention encompasses a method for providing remote access and file sharing functionality between mobile terminals of mobile subscribers in the network. The method may have the steps of: defining at least one privileged mobile terminal that has remote access to a first mobile terminal; defining file sharing strategy for at least one file that is sharable with the at least one privileged mobile terminal; and storing, in a database of the network, identification of the at least one privileged mobile terminal that has remote access privileges to the first mobile terminal, and the file sharing strategy for the at least one file on the first privileged mobile terminal.

BRIEF DESCRIPTION OF THE DRAWINGS

Features of exemplary implementations of the invention will become apparent from the description, the claims, and the accompanying drawings in which:

DETAILED DESCRIPTION

The particular values and configurations discussed in these non-limiting examples can be varied and are cited merely to illustrate an embodiment of the present invention and are not intended to limit the scope of the invention.

Embodiments of the present apparatus and method provide for a telecommunication network to support remote access and file sharing functionality between mobile terminals of mobile subscribers in the network.

One methology of the present method and apparatus is to provide support for remote access to a first mobile terminal for a predefined set of subscriber users by the user of the first mobile terminal. The user of the first mobile terminal may establish a file sharing strategy that may determine, for example, which files may be viewed and/or downloaded by which remote users.

The methology may also allow for authentication of users of mobile terminals that desire to view and/or download files at the first mobile terminal. Such authentication may, for example, utilize passwords. Many other authorization methods are known in the prior art.

The methology may further provide network support for real time retrieval of shared files from the first mobile terminal and display of these files at the other mobile terminal. The telecommunication network thus supports on-demand file downloading and viewing by privileged remote users.

Figure 1:
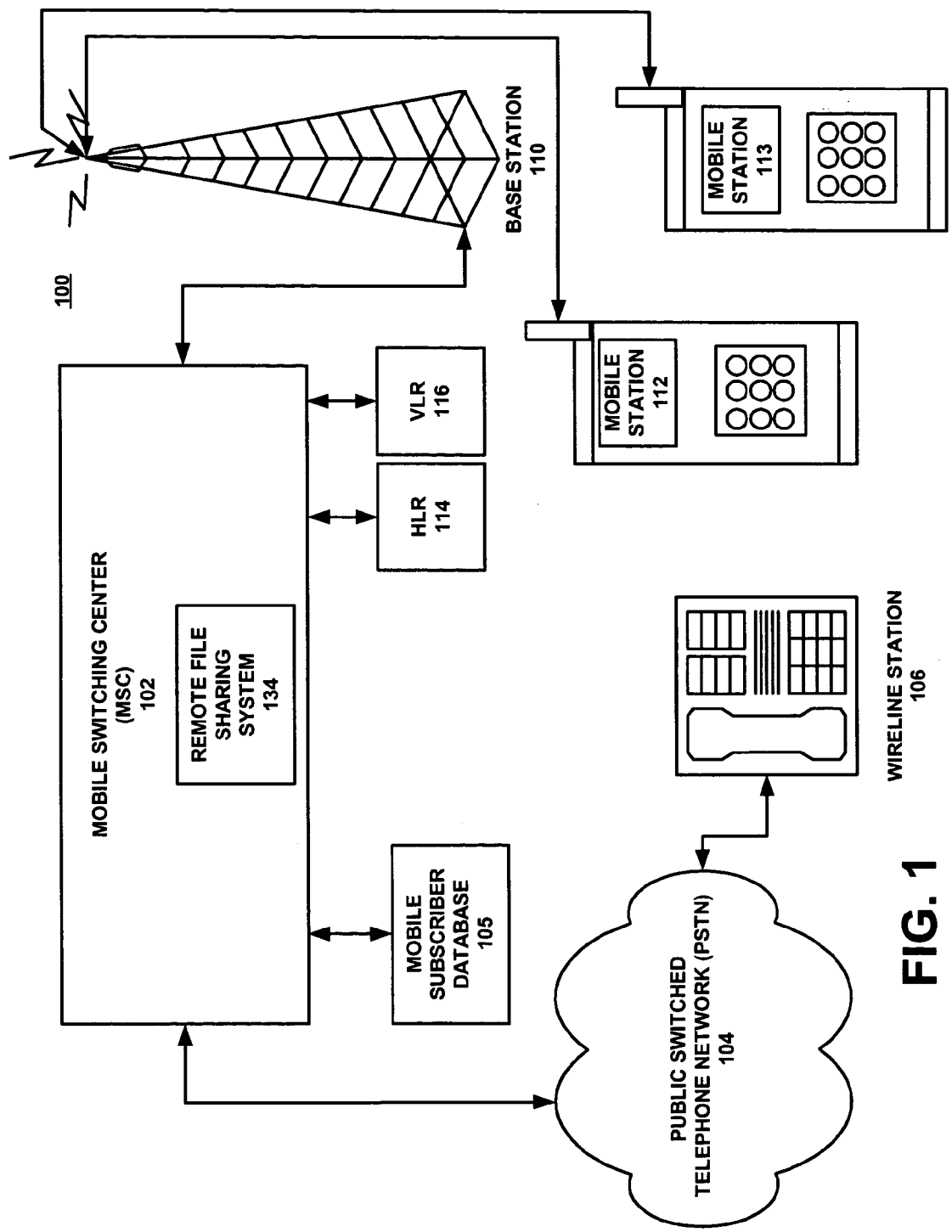
FIG. 1 depicts a block diagram illustrative of a mobile switching center, base station and mobile terminal for use with the present method and system.

The present method and system may be used with wireless, as well as, wired telecommunication networks. Turning to FIG. 1, one example may be a wireless telecommunication network 100. At least first and second mobile terminals 112, 113 of a plurality of mobile terminals may be operatively connected to the telecommunication network 100. Although the present system and method may be used with any type of network (wired and wireless, for example), a subscriber may typically be a mobile subscriber who uses a mobile terminal (also referred to as mobile phone, a cell phone, mobile handset, or car phone).

As depicted in the FIG. 1 embodiment, the network (or telecommunication network) 100 may have a mobile switching center (MSC) 102. The network 100 may be, or may be part of, one or more of a telephone network, a local area network ("LAN"), the Internet, and a wireless network. In the depicted embodiment, a public switched telephone network (PSTN) 104 is connected to the MSC 102. The PSTN 104 routes calls to and from mobile users through the MSC 102. The PSTN 104 also routes calls from and to wireline stations 106. The MSC 102 may also be connected to one or more base stations (BS) 110. Each of the base stations 110 communicates with mobile terminal(s) 112, 113 in its service area. The PSTN 104 generally may be implemented as the worldwide voice telephone network accessible to all those with telephones and access privileges (e.g., AT&T long distance network).

Each of the mobile terminals, such as 1 12, may have a home location register (HLR) 114 where data about each of the mobile terminals 112, 113 resides. Some of the mobile terminals 112, 113 may be remotely located from their home location, and in that case, a visiting location register (VLR) 116 may be set up locally for each mobile terminal 112, 113 that is visiting in its service area. HLR 114 may be implemented as a permanent SS7 database utilized in cellular networks, such as, but not limited to, for example, AMPS (Advanced Mobile Phone System), GSM (Global System for Mobile Communications), and PCS.

HLR 114 may be utilized generally to identify/verify a subscriber, and also may contain subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, may be implemented as a local database maintained by the cellular provider whose territory is being roamed. Mobile terminals 112, 113 may be implemented as cellular devices, personal communication devices, short message service devices or wireless communications devices (e.g., a wireless personal digital assistant).

The MCS 102 may have, or be operatively connected to, components of a system for providing remote access and file sharing functionality between mobile terminals of mobile subscribers in the network. Such components in some embodiments may include remote file sharing system 134 and mobile subscriber database 105.

Figure 2:
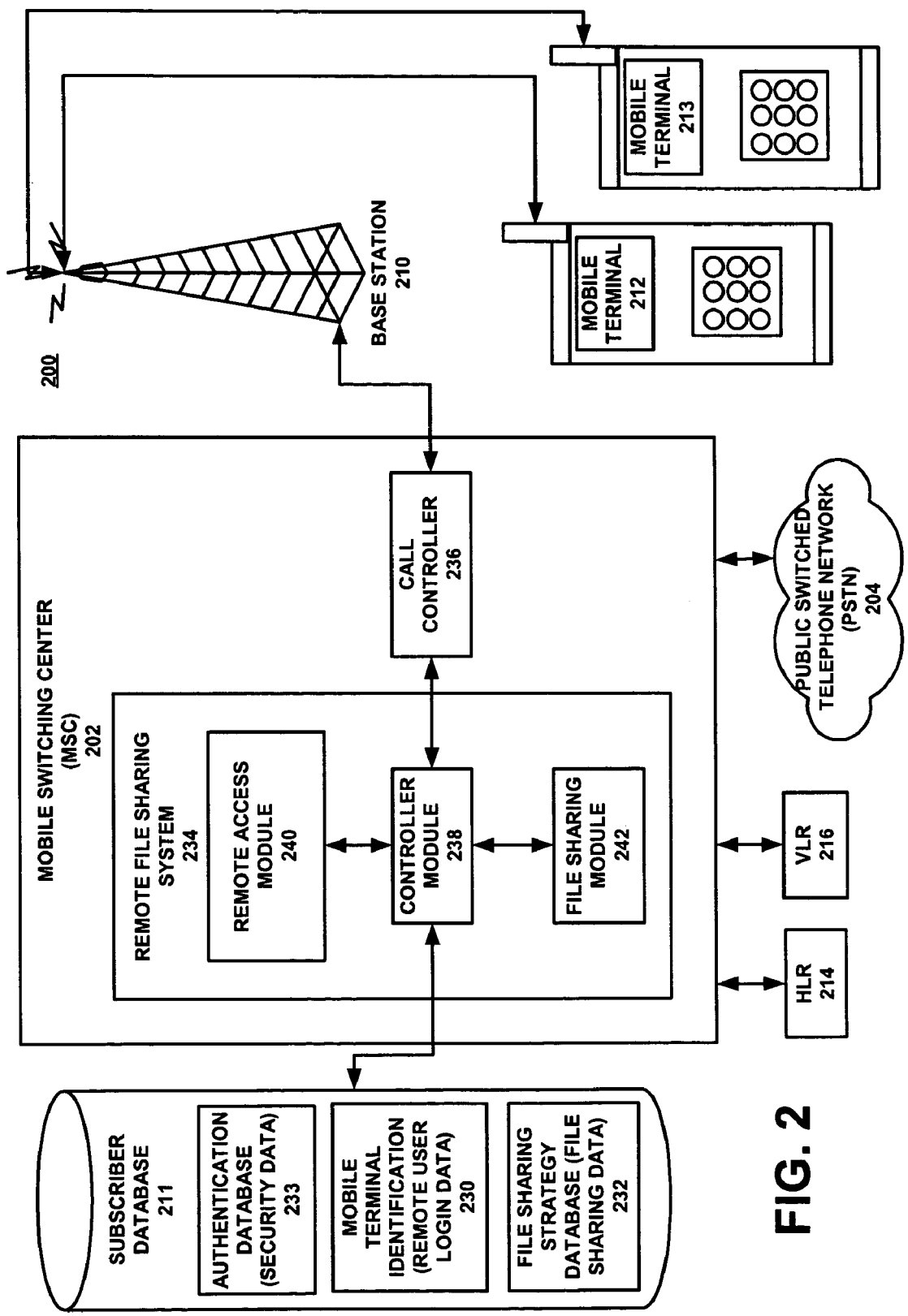
FIG. 2 illustrates a more detailed block diagram illustrative of a mobile switching center, base station, and mobile terminal according to one embodiment of the present method and system.

Referring to FIG. 2, a network (or telecommunication network) 200 is shown for at least first and second mobile terminals 212, 213 of a plurality of mobile terminals operatively connected to the telecommunication network 200. The network 200 has a mobile switching center 202, which is operatively connected to PSTN 204, base station 210, and mobile terminals 212, 213 according to one embodiment of the present method and system. The PSTN 204 routes calls to and from mobile terminal(s) 212, 213 through the MSC 202, and also routes calls from and to wireline stations. The MSC 202 may be connected to one or more base stations 210. The base station 210 communicates through the air with mobile terminals 212, 213, which, for example, may be of a cellular telephone type or of the wider bandwidth personal communication device type. Mobile terminal 212, 213, for example, may be a wireless handset or an automobile mounted station the same as those shown in FIG. 1. The MSC 202 is operatively connected to a VLR 216 and a HLR 214 that interface with the mobile terminals 212, 213 as explained above.

The remote file sharing system 234 may have a controller module 238 operatively connected to a remote access module 240 and to a file sharing module 242. The controller module 238 may be operatively connected to a call controller 236 for interfacing with the mobile terminals 212, 213, and to a subscriber database 211. The subscriber database 211 may have portions designated as a mobile terminal identification database 230 containing remote user login data, and a file sharing strategy database 232 containing file sharing data. The subscriber database 211 may also have a portion designated as an authentication database 233 that may contain security data, such as passwords, for example. Network support for secure remote access for each user of respective privileged mobile terminals may be implemented by the controller module 238, for example, using the security data stored in the authentication database 233.

The functionality of the present apparatus may be separated into or combined into other hardware and software structures. The arrangement depicted in FIG. 2 is one embodiment for implementing the functionality.

Implementation of this file sharing functionality may be accomplished via messaging to the mobile, causing the mobile to execute built-in capabilities. For example, mobile phones are currently capable of executing remote instructions from the network such as 1) tuning from Digital mode to Analog mode, 2) displaying informational messages received from the network, 3) ringing the phone upon the arrival of a call, 4) displaying the contents of an SMS message, etc. This invention requires an application resident on the mobile that would list the files available for sharing, a possibly separate application on the mobile for transmitting a requested file, and the capability to respond to the two new message types (i.e., send a list of sharable files and transmit the contents of a specific file).

Figure 3:
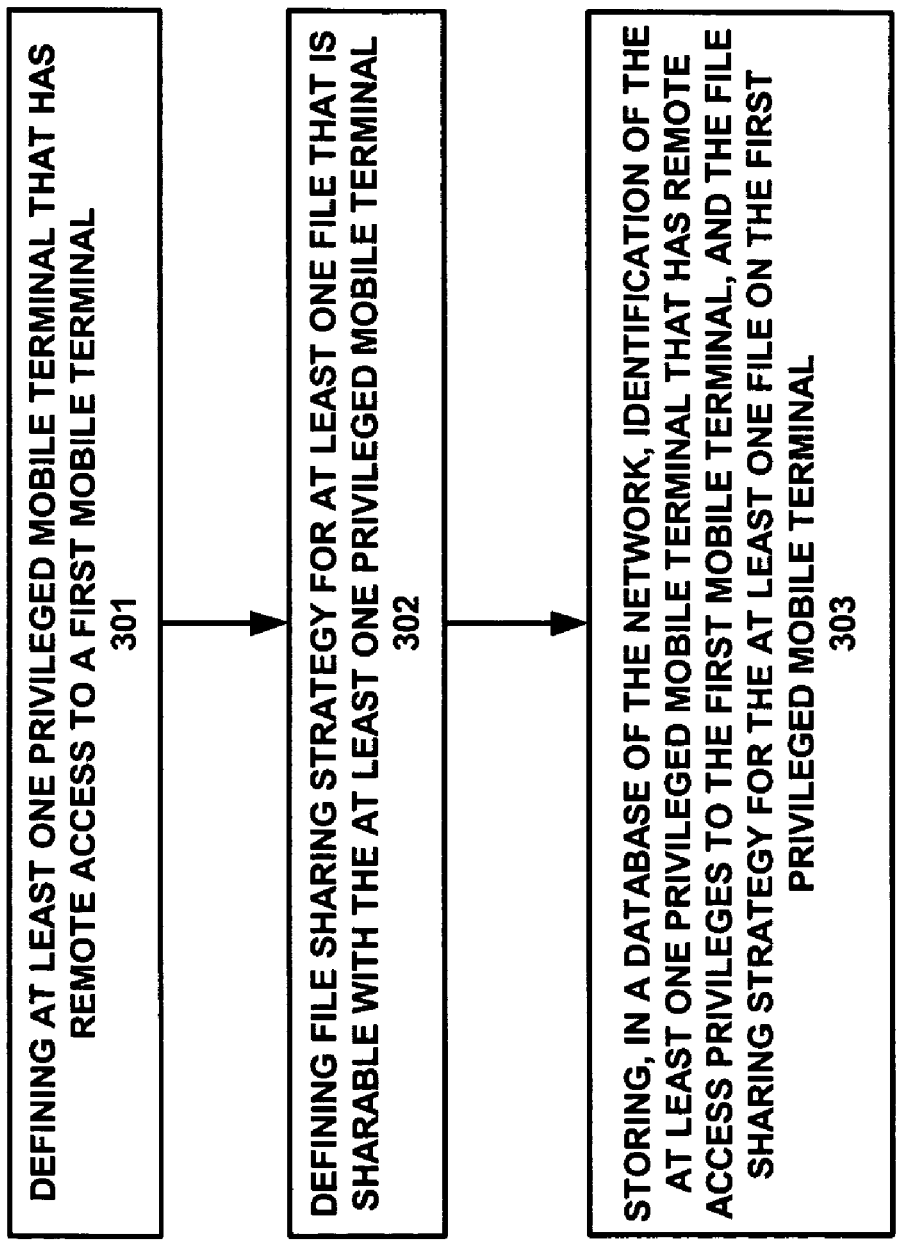
FIG. 3 illustrates a very general flow chart of logical operational steps that may be followed in accordance with one embodiment of the present method and system.

FIG. 3 is a general block diagram depicting an embodiment of the present method. The method may have the steps of: defining at least one privileged mobile terminal that has remote access to a first mobile terminal (step 301); defining file sharing strategy for at least one file that is sharable with the at least one privileged mobile terminal (step 302); and storing, in a database of the network, identification of the at least one privileged mobile terminal that has remote access privileges to the first mobile terminal, and the file sharing strategy for the at least one file on the first privileged mobile terminal (step 303).

Furthermore, the at least one privileged mobile terminal, which has remote access to the first mobile terminal, may have capabilities of at least one of viewing files and downloading files according to the file sharing strategy of the first mobile terminal. A plurality of privileged mobile terminals may be defined to have remote access to a first mobile terminal.

The first mobile terminal may have a plurality of sharable files, and a respective file sharing strategy may be defined for each file of the plurality of sharable files. Alternatively, the first mobile terminal may have a plurality of sharable files, and a single file sharing strategy may then be applicable to each file of the plurality of sharable files. In either case, file sharing strategy may be defined only at the first mobile terminal.

An embodiment of the present apparatus and method may further have network support for secure remote access for each user of respective privileged mobile terminals. For example, the network may provide password protection for the secure remote access for each user of respective privileged mobile terminals.

Figure 4:
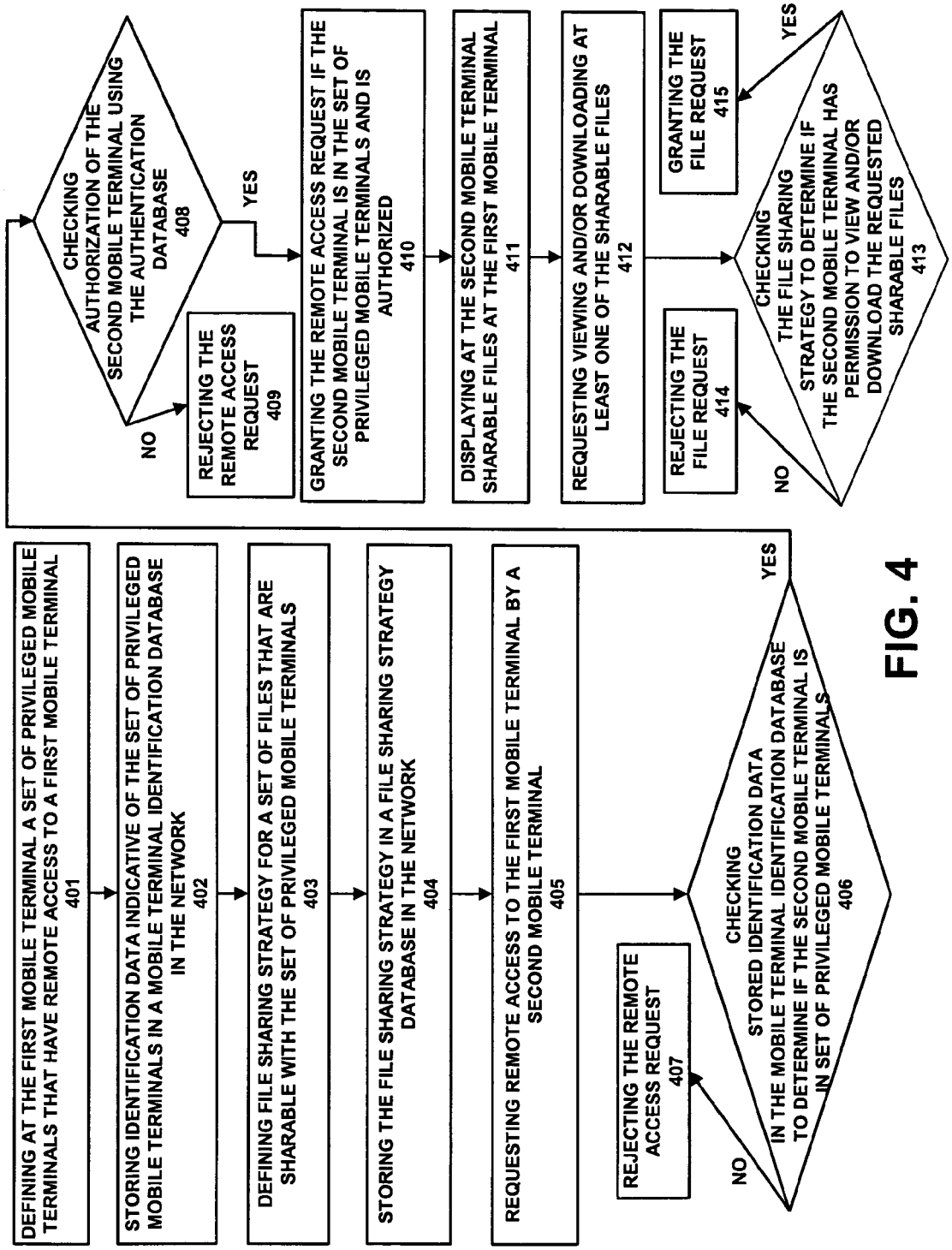
FIG. 4 illustrates another flow chart of logical operational steps that may be followed in accordance with one embodiment of the present method and system.

FIG. 4 is a block diagram depicting another embodiment of the present method. This embodiment of the method may have the steps of: defining at the first mobile terminal a set of privileged mobile terminals that have remote access to a first mobile terminal (step 401); storing identification data indicative of the set of privileged mobile terminals in a mobile terminal identification database in the network (step 402); defining file sharing strategy for a set of files that are sharable with the set of privileged mobile terminals (step 403); storing the file sharing strategy in a file sharing strategy database in the network (step 404); requesting remote access to the first mobile terminal by a second mobile terminal (step 405); checking the stored identification data in the mobile terminal identification database to determine if the second mobile terminal is in the set of privileged mobile terminals (step 406); rejecting the remote access request if the second mobile terminal is not in the set of privileged mobile terminals (step 407); checking authorization of the second mobile terminal using the authentication database (step 408); rejecting the remote access request if the second mobile terminal is not in the set of privileged mobile terminals (step 409); granting the remote access request if the second mobile terminal is in the set of privileged mobile terminals and is authorized (step 410); displaying at the second mobile terminal sharable files at the first mobile terminal (step 411); requesting, by the second mobile terminal, at least one of viewing and downloading at least one of the sharable files (step 412); checking the stored file sharing strategy in the file sharing strategy database to determine if the second mobile terminal has permission to at least one of view and download the requested sharable files (step 413); rejecting the file request if the file sharing strategy does not allow viewing and/or downloading of the requested sharable files by the second mobile terminal (step 414); and granting the file request if the file sharing strategy does allow viewing and/or downloading of the requested sharable files by the second mobile terminal (step 415).

In some embodiments a respective file sharing strategy may be defined for each file of the plurality of sharable files at the first mobile terminal, or the file sharing strategy may be, applicable to each file of the plurality of sharable files.

Therefore, the improved present method and system overcomes the drawbacks of the prior art and provides, for use in a telecommunications network, remote access and file sharing functionality between mobile terminals of mobile subscribers in the network.

The present system and method may be used with non-mobile phones and terminals, as well as, mobile phones and mobile terminals. Also, different types of data storage devices may be used with the present method and system. For example, a data storage device may be one or more of a magnetic, electrical, optical, biological, and atomic data storage medium.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method for use in a telecommunications network for providing remote access and file sharing functionality between mobile terminals of mobile subscribers in the network, the method comprising the steps of:

establishing only at a first mobile terminal a plurality of file sharing strategies, the first mobile terminal further having a plurality of sharable files;

assigning a respective single file sharing strategy of the plurality of file sharing strategies to each respective file of the plurality of sharable files;

defining at least one privileged mobile terminal that has remote access to the first mobile terminal;

defining a respective file sharing strategy of the plurality of file sharing strategies for a respective file of the plurality of sharable files that is sharable with the at least one privileged mobile terminal; and storing, in a database of the network, identification of the at least one privileged mobile terminal that has remote access privileges to the first mobile terminal, and the plurality of file sharing strategies for the plurality of files on the first privileged mobile terminal; and sharing files of the plurality of files between the first mobile terminal and the at least one privileged mobile terminal based on the respective file sharing strategies;

wherein a user of the first mobile terminal establishes a file sharing strategy that determines which files are viewable and downloadable by which other mobile terminals of remote users, and wherein shared files at the first mobile terminal are retrieved by the other mobile terminals in real time and displayed at the other mobile terminals;

wherein a first application is resident on at least the first mobile terminal that lists files available for sharing, wherein a second application is resident on at least the first mobile terminal that for transmitting a requested file, and wherein the at least the first mobile terminal has a capability to respond to messages to send a list of sharable files and to transmit contents of a specific file.

2. The method according to claim 1, wherein the at least one privileged mobile terminal, which has remote access to the first mobile terminal, has capabilities of at least one of viewing files and downloading files according to the file sharing strategy of the first mobile terminal.

3. The method according to claim 1, wherein a plurality of privileged mobile terminals are defined to have remote access to a first mobile terminal.

4. The method according to claim 1, wherein the first mobile terminal has a plurality of sharable files and, wherein a respective file sharing strategy is defined for each file of the plurality of sharable files.

5. The method according to claim 1, wherein the first mobile terminal has a plurality of sharable files and, wherein the file sharing strategy is applicable to each file of the plurality of sharable files.

6. The method according to claim 1, wherein the method comprises defining file sharing strategy only at the first mobile terminal.

7. The method according to claim 1, wherein the method further comprises providing network support for secure remote access for each user of respective privileged mobile terminals.

8. The method according to claim 7, wherein the network provides password protection for the secure remote access for each user of respective privileged mobile terminals.

9. A method for use in a telecommunications network for providing remote access and file sharing functionality between mobile terminals of mobile subscribers in the network, the method comprising the steps of:

establishing only at a first mobile terminal a plurality of file sharing strategies, the first mobile terminal further having a plurality of sharable files;

assigning a respective single file sharing strategy of the plurality of file sharing strategies to each respective file of the plurality of sharable files;

defining at the first mobile terminal a set of privileged mobile terminals that have remote access to a first mobile terminal;

storing identification data indicative of the set of privileged mobile terminals in a mobile terminal identification database in the network;

defining a respective file sharing strategy of the plurality of file sharing strategies for a respective file of a plurality of files that are sharable with the set of privileged mobile terminals;

storing the plurality of file sharing strategies in a file sharing strategy database in the network;

requesting remote access to the first mobile terminal by a second mobile terminal;

checking the stored identification data in the mobile terminal identification database to determine if the second mobile terminal is in the set of privileged mobile terminals;

rejecting the remote access request if the second mobile terminal is not in the set of privileged mobile terminals;

granting the remote access request if the second mobile terminal is in the set of privileged mobile terminals;

displaying at the second mobile terminal sharable files at the first mobile terminal;

requesting, by the second mobile terminal, at least one of viewing and downloading at least one of the sharable files;

checking the stored file sharing strategy in the file sharing strategy database to determine if the second mobile terminal has permission to at least one of view and download the requested sharable files;

rejecting the file request if the file sharing strategy does not allow viewing and/or downloading of the requested sharable files by the second mobile terminal; and granting the file request if the file sharing strategy does allow viewing and/or downloading of the requested sharable files by the second mobile terminal;

wherein a user of the first mobile terminal establishes a file sharing strategy that determines which files are viewable and downloadable by which other mobile terminals of remote users, and wherein shared files at the first mobile terminal are retrieved by the other mobile terminals in real time and displayed at the other mobile terminals;

wherein a first application is resident on at least the first mobile terminal that lists files available for sharing, wherein a second application is resident on at least the first mobile terminal that for transmitting a requested file, and wherein the at least the first mobile terminal has a capability to respond to messages to send a list of sharable files and to transmit contents of a specific file.

10. The method according to claim 9, wherein the first mobile terminal has a plurality of sharable files and, wherein a respective file sharing strategy is defined for each file of the plurality of sharable files.

11. The method according to claim 9, wherein the first mobile terminal has a plurality of sharable files and, wherein the file sharing strategy is applicable to each file of the plurality of sharable files.

12. The method according to claim 9, wherein the method comprises defining file sharing strategy only at the first mobile terminal.

13. The method according to claim 9, wherein the method further comprises providing network support for secure remote access for each user of respective privileged mobile terminals.

14. The method according to claim 13, wherein the network provides password protection for the secure remote access for each user of respective privileged mobile terminals.

15. The method according to claim 13, wherein the network provides authentication checking for the secure remote access for each user of respective privileged mobile terminals.

16. An apparatus for use in a telecommunications network in which is provided remote access and file sharing functionality between mobile terminals of mobile subscribers in the network, the apparatus comprising:

a telecommunication network operatively connected to at least first and second mobile terminals, the first mobile terminal having a plurality of sharable files, only the first mobile terminal establishing a plurality of file sharing strategies;

the telecommunication network having a call controller, a mobile subscriber database, and a remote file sharing system;

identification data indicative of a set of privileged mobile terminals stored in a mobile terminal identification database in the network;

defining a respective file sharing strategy of the plurality of file sharing strategies for a respective file of a plurality of files that are sharable with respective ones of the set of privileged mobile terminals, the plurality of file sharing strategies stored in a file sharing strategy database in the network;

the remote file sharing system having a controller module operatively connected to a remote access module and to a file sharing module, the controller module also operatively connected to the call controller, to the mobile terminal identification database and to the file sharing strategy database; and wherein the second mobile terminal, which has remote access to the first mobile terminal, has capabilities of at least one of viewing files and downloading files in the plurality of files according to respective file sharing strategies of the plurality file sharing strategies of the first mobile terminal;

wherein a user of the first mobile terminal establishes a file sharing strategy that determines which files are viewable and downloadable by which other mobile terminals of remote users, and wherein shared files at the first mobile terminal are retrieved by the other mobile terminals in real time and displayed at the other mobile terminals;

wherein a first application is resident on at least the first mobile terminal that lists files available for sharing, wherein a second application is resident on at least the first mobile terminal that for transmitting a requested file, and wherein the at least the first mobile terminal has a capability to respond to messages to send a list of sharable files and to transmit contents of a specific file.

17. The apparatus according to claim 16, wherein the apparatus further comprises network support for secure remote access for each user of respective privileged mobile terminals.

18. The apparatus according to claim 17, wherein the network support for secure remote access comprises an authentication database having security data for each of the privileged mobile terminals.

19. The apparatus according to claim 18, wherein the security data comprises passwords.

20. The apparatus according to claim 18, wherein the authentication database is a portion of the mobile subscriber database.

21. The apparatus according to claim 16, wherein the mobile terminal identification database and the file sharing strategy database are portions of the mobile subscribers database.

22. The apparatus according to claim 16, wherein the first mobile terminal has a plurality of sharable files and, wherein a respective file sharing strategy is defined for each file of the plurality of sharable files.

23. The apparatus according to claim 16, wherein the first mobile terminal has a plurality of sharable files and, wherein the file sharing strategy is applicable to each file of the plurality of sharable files.

24. The apparatus according to claim 16, wherein the file sharing strategy is defined only at the first mobile terminal.

* * * * *